United States Patent [19]

Lew

[11] Patent Number: 4,798,091
[45] Date of Patent: Jan. 17, 1989

[54] DUAL S-TUBE CORIOLIS FORCE FLOWMETER

[76] Inventor: Hyok S. Lew, 7890 Oak St., Arvada, Colo. 80005

[21] Appl. No.: 941,352

[22] Filed: Dec. 15, 1986

Related U.S. Application Data

[63] Continuation-in-part of Ser. No. 725,986, Apr. 22, 1985, Pat. No. 4,628,744.

[51] Int. Cl.$^4$ .............................................. G01F 1/84
[52] U.S. Cl. ................................................ 73/861.38
[58] Field of Search ........................ 73/861.38, 861.37

[56] References Cited

U.S. PATENT DOCUMENTS 4,559,833 12/1985 Sipin ................................ 73/861.38

Primary Examiner—Herbert Goldstein

[57] ABSTRACT

The Coriolis force flowmeter of the present invention comprises a first sinuous conduit with a S-shaped midsection disposed on a first plane and a second sinuous conduit with a S-shaped midsection disposed on a second plane generally parallel to the first plane wherein the two sinuous conduits are disposed in an axisymmetric arrangement about an axis intermediate and parallel to the two planes. An electromagnetic vibrator exerting oscillatory forces to the midsections of the two sinuous conduits generates relative flexural vibrations therebetween. Two motion detectors respectively measuring the flexural vibrations of the two halves of at least one of the two sinuous conduits provides the difference in the flexural vibrations therebetween as a measure of mass flow rate of fluid moving through the two conduits.

4 Claims, 2 Drawing Sheets

DUAL S-TUBE CORIOLIS FORCE FLOWMETER

BACKGROUND OF THE INVENTION

This patent application is Continuation-In-Part application to patent application Ser. No. 725,986 entitled "S-tube Coriolis force flowmeter" filed on Apr. 22, 1985, now U.S. Pat. No. 4,628,744.

The principles of the Coriolis force flowmeter have been known for more than twenty years. However, the introduction of the Coriolis force flowmeter to industry has taken place only in the last four or five years. It is accurate to say that the present day technology of the Coriolis force flowmeter is at an infantile stage. There is little doubt that, in the near future, a far superior technology will emergy and he present day know-how in the Coriolis force flowmeter will become absolete.

SUMMARY OF THE INVENTION

The primary object of the present inventio nis to provide a Coriolis force flowmeter employing a dual S-tube arranged in a rotationally symmetric configuration about the common axis of the inlet and outlet of the flowmeter.

Another object is to provide the dual S-tube Coriolis force flowmeter wherein a forced rectilinear vibration of the two S-tubes relative to one another in a direction perpendicular to the plane includig the S-tubes generates an angular oscillatory motion of the S-tubes about an axis tangential to the point of inflection of the S-tubes.

A further object is to provide the dual S-tube Coriolis force flowmeter wherein the amplitude of the angular oscillatory motion of the S-tubes about the axis tangential to the point of inflection of the S-tubes is directly proportional to the mass flow rate of fluid moving through the S-tubes.

Yet another object is to provide the dual S-tube coriolis force flowmeter including a data processor that converts the amplitude of the oscillatory motion of the S-tubes about the axis tangential to the point of inflection of the S-tubes to data on mass flow rate through the S-tubes.

Yet a further object of the present invention is to provide a Coriolis force flowmeter having greater sensitivity than the existing Coriolis force flowmeters such as those employing U-tubes or closed loops of tubes.

Still another object is to provide a Coriolis force flowmeter of more compact and light weight construction compared with the existing Coriolis force flowmeters.

Still a further object is to provide a Coriolis force flowmeter having a balanced mass distribution about the common axis of the inlet and outlet of the flowmeter whereby it can be installed in any position relative to the direction of the earth's gravitational pull.

These and other objects of the present invention will become clear as the description thereof proceeds.

BRIEF DESCRIPTION OF THE FIGURES

The present invention may be descibed with greater clarity and specificity by referring to the following figures.

DESCRIPTION OF THE ILLUSTRATED EMBODIMENTS

Figure 1:
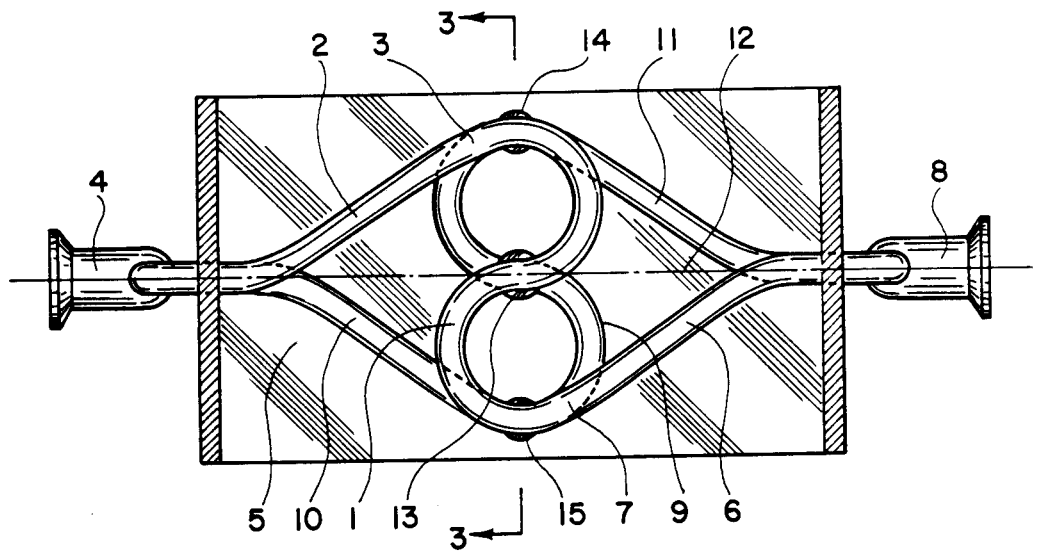
FIG. 1 illustrates a plan view of an embodiment of the dual S-tube Coriolis force flowmeter constucted in accordance with the principles of the present invention.
Figure 4:
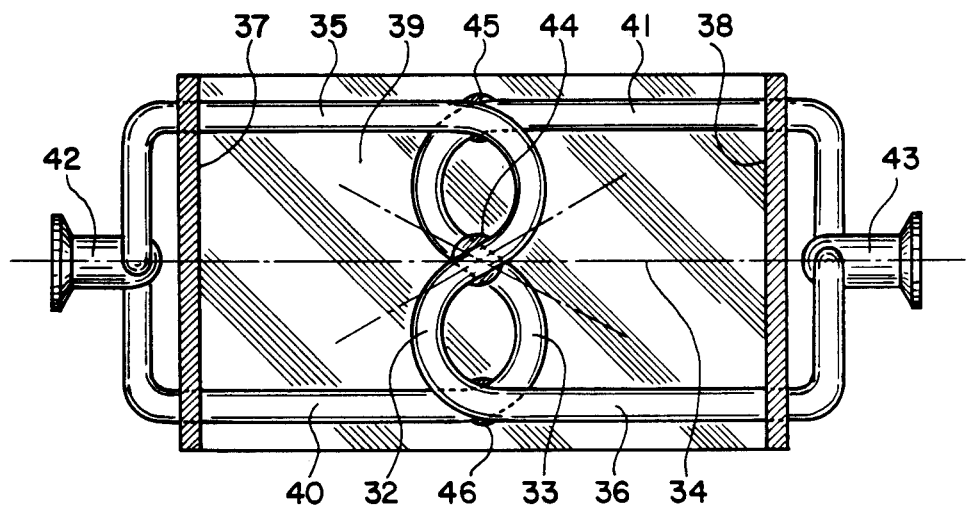
FIG. 4 illustrates a plan view of another embodiment of the dual S-tube Coriolis force flowmeter constructed in accordance with the principles of the present invention.

In FIG. 1 there is illustrated a plan view of an embodiment of the dual S-tube Coriolis force flowmeter constructed in accordance with the principles of the present invention. The first S-tube 1 of the dual S-tube arrangement is disposed on a first plane wherein the first extension 2 of one extremity 3 of the first S-tube 1 connected to the inlet 4 is anchored to the frame 5 having a rigid construction, while the second extension 6 of the other extremity 7 of the first S-tube connected to the outlet 8 is anchored to the frame 5 of the flowmeter. The second S-tube 9 uncluding extension rubings 10 and 11 respectively extending from the two extremities of the second S-tube 9 and anchored to the frame 5 is disposed on a second plane parallel to the first plane including the first S-tube 1 in a rotationally symmetric arrangement about an axis parallel tothe extension tubes 2, 6 10 and 1 at the point of anchoring thereof to the frame 5 of the flowmeter. In other words, the configuration of the second S-tube 9 results when the first S-tube 1 is rotated 180 degrees about the axis 12 and, then, shifted a small distance in a direction perpendicular to the first plane including the first S-tube 1. An electromagnet 13 energized by an alternating current is disposed intermediate the two S-tubes 1 and 9 at the point of inflections thereof, wherein the electromagnet 13 is affixed to the frame 5 of the flowmeter. A first means 14 for measuring the oscillatory motion of the two S-tubes relative to the frame 5 is disposed adjacent to the first extremities 3 of the S-tubes, while the second means 15 for measuring the oscillatory motion of the two S-tubes relative to the frame 5 is disposed adjacent to the second extremities 7 of the S-tubes. Those means for measuring the oscillatory motion of the S-tubes in a direction perpendicular to the planes respectively including the two S-tubes 1 and 9 may be an accelerometer or position sensor operating on electromagnetic principles, from which the velocity of the S-tube is derived. It must be mentioned that the angle of turn of the S-tubes between the electromagnet 13 and one of the two means 14 and 15 for measuring the velocity may be equal to 180 degrees as shown in the particular embodiment shown in FIG. 1, or less than 180 degrees as shown in FIG. 4, or greater than 180 degrees.

Figure 2:
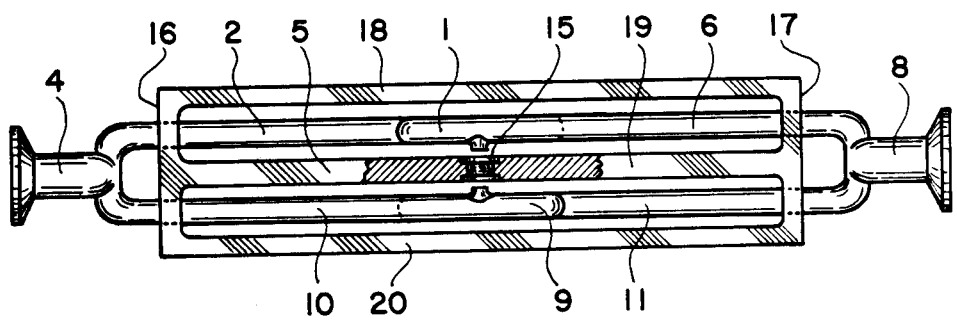
FIG. 2 illustrates an elevation view of the dual S-tube Coriolis force flowmeter shown in FIG. 1.

In FIG. 2 thereis illustrated an elevation view of the dual S-tube Coriolis force flowmeter shown in FIG. 1. The first S-tube 1 is disposed on the first plane and the second S-tube 9 is disposed on the second plane parallel to the first plane. The extension tubes 2 and 6 extending from the first S-tube 1 are rigidly anchored to the frame 5 as those extension tubes respectively extend through and are anchored tothe end plates 16 and 17 rigidly affixed to the top, middle and bottom plates 18, 19 and 20 constituting the frame 5 of the flowmeter. The extension tubes 10 and 11 extending from the second S-tube 9 respectively extend through and are anchored to the two end plates 16 and 17. The first extension tubes 2 and 10 respectively extending from the first extremities of the two S-tubes 1 and 9 merge to the inle or first port 4 of the flowmeter, while the second extension tubes 6 and 11 respectively extending from the second extremities of the two S-tubes 1 and 9 merge to the outlet or second port 8 of the flowmeter.

Figure 3:
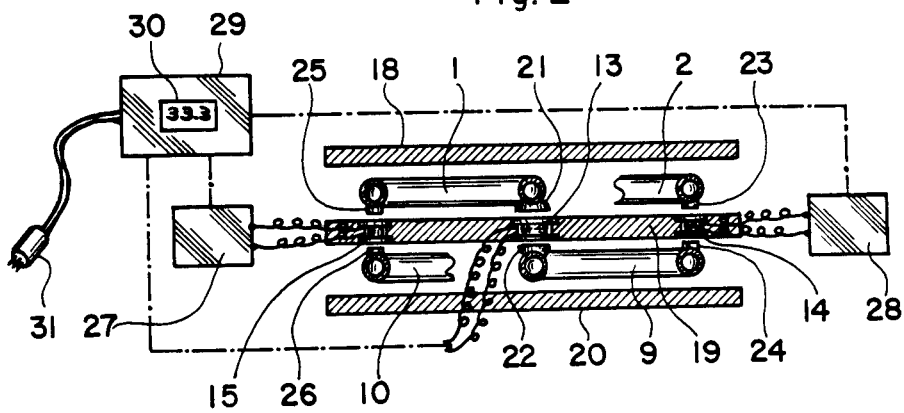
FIG. 3 illustrates a cross section of the dual S-tube Coriolis force flowmeter of FIG. 1 taken along plane 3—3 as shown in FIG. 1, which cross section view also illustrates an embodiment of the sensors employed for the detection and measurement of the oscillatory angular motion of the S-tubes proportional to the mass flow rate.

In FIG. 3 there is illustrated a cross section of the dual S-tube Coriolis force flowmeter shown in FIGS. 1 and 2, which cross section is taken along plane 3—3 as shown in FIG. 1. The electromagnet 13 disposed at the point of inflection of the two S-tubes and the two means 14 and 15 for measuring the oscillatory motion of the two S-tubes respectively disposed near the two extremities of the two S-tubes are affixed to the middle plate 19, as those elements disposed within holes disposed through the middle plate 19 and rigidly secured thereto. A pair of ferromagnetic vibrators 21 and 22 respectively affixed to the two S-tubes 1 and 9 are disposed adjacent to the two pole faces of the electromagnet 13 in a close spacing, respectively. The first means 14 measures the individual velocitties of the two targets 23 and 24 respectively affixed to the two S-tubes 1 and 9 or the vector sum of the individual velocities of those two targets, while the second means 15 measures individual velocities of the two targets 25 and 26 respectively affixed to the two S-tubes 1 and 9 or the the vector sum of the individual velocities of those two targets. The electric signals from the two means 14 and 15 for measuring velocities are filtered and amplified respectively by a pair of electronic signal processors 27 and 28. The filtered and amplified signals from the electronic signal processors 27 and 28 are fed to the data processor 29 which converts those signals to data related to the fluid flow throughthe two S-tubes 1 and 9. The data processor may include display means 30 for displaying the flow data and/or output means 31 for transmitting the flow data to other flow controlling or processing equipments.

The dual S-tube Coriolis force flowmeter described in conjunction with FIGS. 1, 2 and 3 operates on the following principles: The forced oscillatory rectilinear motion of the S-tubes in the direction perpendicular to the planes respectively including the two S-tubes, which oscillatory rectilinear motions generated by the electromagnet 13 has frequency $\omega$ and amplitude $A_1$ and $A_2$ for the two S-tubes, respectively, produce oscillatory angular torsions about the pivoting axis 12 of frequency $\omega$ and amplitude $B_1 A_1\omega \dot{M}_2$ and $B_2 A_2\omega \dot{M}_1$ for the two S-tubes, respectively, where $B_1$ and $B_2$ are constant of proportionality, and $\dot{M}_1$ and $\dot{M}_2$ are mass flow rate through the two S-tubes, respectively. It is not difficult to notice that the forced vibrations of the two S-tubes are in the two opposing directions as those S-tubes are pulled toward and pushed away from one another by the action of the electromagnet 13. The direction of the Coriolis torque about the axis 12 is proportional to the combination of the forced vibration multiplied by the angular momentum of the fluid flow moving through the curved portion of the S-tubes and the time rate of change of the forced vibration multiplied by the torque arm measured from the pivoting axis 12 to the central axis of the extension tubes. The angular momentums and the torque arms of the two S-tubes have opposite signs and, consequently, the Coriolis torques for the two S-tubes are in the same direction.

The motion of the first S-tube respectively measured by the first means 14 and second means 15 for measuring velocity is of the form $$V_{11} = A_{11}\sin\omega t + C_{11}\omega \dot{M}_1 \cos\omega t, \quad (1)$$

$$V_{12} = A_{12}\sin\omega t - C_{12}\omega \dot{M}_1 \cos\omega t, \quad (2)$$

where V designates the measured velocity, A is the amplitudes of the forced vibration, C is the constant of proportionality, and the first subscript stands for the first S-tube, while the second subscript stands for the first or second means for measuring the velocity. It is readily recognized that the first term on the right hand side of the aforementioned equations represents the motion associated with the forced vibrations induced by the electromagnet 13, while the second term represents the motion associated with the Coriolis force or torque. Similarly, the motion of the second S-tube respectively measured by the first means 14 and the second means 15 for measuring velocity is of the form $$V_{21} = -A_{21}\sin\omega t + C_{21}\omega \dot{M}_2 \cos\omega t, \quad (3)$$

$$V_{22} = -A_{22}\sin\omega t - C_{22}\omega \dot{M}_2 \cos\omega t, \quad (4)$$

In general, $A_{11}$ is porportional to $A_{12}$ and $A_{21}$ is proportional to $A_{22}$, i.e., $$A_{11} = \lambda_1 A_{12} \text{ and } A_{21} = \lambda_2 A_{22}. \quad (5)$$

After substituting equation (5) into equations (1) and (3), equations (1)-(4) can be solved to obtain the following relation for the total mass flow rate of the fluid moving throughthe two S-tubes $$\dot{M} = \dot{M}_1 + \dot{M}_2 = \frac{[V_{11} - \lambda_1 V_{12}]}{\omega(C_{11} + \lambda_1 C_{12})} + \frac{[V_{21} - \lambda_2 V_{22}]}{\omega(C_{21} + \lambda_2 C_{22})}, \quad (6)$$

where the symbol [ ] stands for the amplitude of the combination of quantities enclosed within the square bracket. In general, equation (6) may be written as $$\dot{M} = \frac{K_1}{\omega}[V_{11} - \lambda_1 V_{12}] + \frac{K_2}{\omega}[V_{21} - \lambda_2 V_{22}], \quad (7)$$

where $K_1$ and $K_2$ are constants which are generally determined by experiment or calibration of the flowmeter, while $\lambda_1$ and $\lambda_2$ are determined by experiments under the forced vibration at frequency $\omega$ with zero mass flow. If the two S-tubes are truly identical in construction and in the rotationally symmetric arrangement, the equation (7) for the total mass flow rate reduce to $$M = 2\frac{K_1}{\omega}[V_{11} - V_{12}]. \quad (8)$$

In other words, the total mass flow rate can be determined by measuring the motion of one of the two S-tubes at the two points straddling the pivoting axis 12. The constants of proportionality included in equation (7) or (8) are entered to the memory of the data processor 30 shown in FIG. 3, which data processor executes the computations required to extract the mass flow rate data from the velocity measurement performed by the two velocity or position or acceleration sensors 14 and 15. It is generally required to induce the forced vibration fo the S-tubes by the electromagnet 13 at a resonance frequency of the individual S-tubes filled with the fluid medium flowing therethrough.

In FIG. 4 there is illustrated a plan view of another embodiment of the dual S-tube Coriolis force flowmeter constructed in accordance with the principles of the present invention. This embodiment includes the first S-tube 32 and the second S-tube 33 respectively disposed on two parallel planes in a rotationally symmetric configuration about an axis 34 located half way between and parallel to the two planes respectively including the two S-tubes, which axis included in a plane simultaneously including the points of inflection of the two S-tubes. The first and second extensiontubes 35 and 36 of the first S-tube 32 respectively extend from the two extremities of the first S-tube in two opposite directions parallel to the axis 34 of the rotational symmetry, which are respectively anchored tothe two end plates 37 and 39 constituting the frame 39 of the flowmeter. The first and second extension tubes 40 and 41 respectively extending from the two extremities of the second S-tube 33 in two opposite directions parallel to the axis 34 of the rotational symmetry are anchored to the two end plates 37 and 38, respectively. The extension tubes 35 and 40 merge to the inlet or first port 42, while the extension tubes 36 and 41 merge to the outlet or second port 43 of the flowmeter. The electromagnet 44 inducing the forced vibration is disposed coaxially about the line connecting the two points of inflection of the two S-tubes. The two means 45 and 46 for measuring the velocity are respectively disposed near the two extremities of the S-tubes. In this particular embodiment, the angle of turn in the S-tube between one extremity thereof and the point of inflection is less than 180 degrees and, consequently, the two lines respectively tangential to the two S-tubes at the point of inflection cross one another. It should be noticed that the axis 34 of rotational symmetry is located intermediate the two lines of tangent. As described in explaining the operating principles of the Coriolis force flowmeter illustrated in FIGS. 1, 2 and 3, the velocity measuring means 45 and 46 measures the oscillatory angular motion of the S-tubes about the axis 34 of rotational symmetry, that is created by the forced vibration induced by the electromagnet 44 at the resonance frequency of the individual S-tubes. The amplitude of the oscillatory angular motion is proportioned to the mass flow rate through the S-tubes and, consequently, data on mass flow rate through the S-tubes are extracted therefrom.

Figure 5:
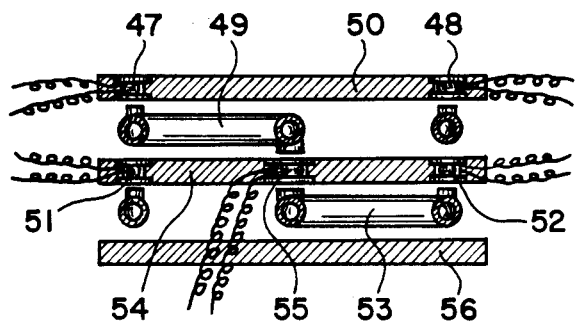
FIG. 5 illustrates a cross section of the dual S-tube Coriolis force flowmeter equivalent to the cross section shown in FIG. 3, that illustrates another embodiment of the sensors employed for the detection and measurement of the oscillatory angular motion of the S-tubes proportional to the mass flow rate.

In FIG. 5 there is illustrated another cross section of a Coriolis force flowmeter of the present invention equivalent to the cross section shown in FIG. 4. In this particular embodiment, the velocity or position sensors 47 and 48 respectively measuring the velocities of the two extremities of the first S-tube 49 are affixed to the top plate 50 of the flowmeter frame, while the velocity or position sensors 51 and 52 respectively measuring the velocities of the two extremities of the second S-tube 53 are affixed to the middle plate 54. The electromagnet 55 inducing the forced vibration is affixed to the middle plate 55. Of course, the forced vibration of the S-tubes can be induced by two separate electromagnets respectively affixed to the top plate 50 and the bottom plate 56, which two electromagnets are excited in unison by an alternating current, instead of the single electromagnet 55 affixed to the middle plate 54.

Figure 6:
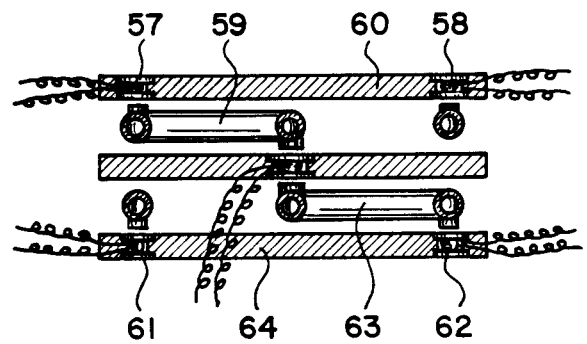
FIG. 6 illustrates a further embodiment of the sensors employed for the detection and measurement of the oscillatory angular motion of the S-tubes proportional to the mass flow rate.

In FIG. 6 there is illustrated a further cross section of a Coriolis force flowmeter of the present invention equivalent to the cross section shown in FIG. 5. In this particular embodiment, the velocity or position sensors 56 and 57 measuring the velocity of the first S-tube 59 are affixed tothe top plate 60, while the velocity or position sensors 61 and 62 measuring the velocity of the second S-tube 63 are affixed to the bottom plate 64.

It should be understood that the mass flow rate can be measured by two velocity or position sensors measuring the velocities of the two extremities of one of the two S-tubes, or by two velocity or position sensors respectively measuring the velocities of one extremity of the two S-tubes, or by four velocity or position sensors measuring the velocities of the two extremities of the two S-tubes. The employment of the particular combination of the velocity or position sensors should be determined based on specific design requirements and working conditions as a matter of design.

While the principles of the present invention have now been made clear by the illustrative embodiments, it will be immediately obvious to those skilled in the art many modifications of structures, arrangements, proportions, elements and materials which are particularly adapted to the specific working environments and operating conditions in the practice of the invention without departing from those principles.

I claim:

1. An apparatus for measuring flow rate comprising in combination:

(a) a frame;

(b) a first sinuous conduit disposed on a first plane and secured to said frame at two extremities thereof, said first sinuous conduit including a first smooth bend adjacent to one extremity of said first sinuous conduit turning about a first direction; a second smooth bend adjacent to said first smooth bend turning about a second direction opposite to said first direction; a third smooth bend adjacent to said second smooth bend turning about said first direction and a fourth smooth bend intermediate said third smooth bend and the other extremity of said sinuous conduit turning about said second direction, wherein the combination of said first and second smooth bends and the combination of said third and fourth smooth bends are axisymmetric to one another about a first axis perpendicular to said first plane and passing through midsection of said first sinuous conduit;

(c) a second sinuous conduit disposed on a second plane parallel to said first plane and secured to said frame at two extremities hereof, wherein said second sinuous conduit and said first sinuous conduit providing two flow passages connected to a common inlet and outlet are axisymmetric to one another about a second axis located half way between said first and second planes and substantially intersecting said first axis in perpendicular angle;

(d) means for exerting oscillatory force to said first and second sinuous conduits at midsections thereof, wherein said means vibrates said first and second sinuous conduits relative to one another in directions transverse to the planes including said first and second sinuous conduits, and thus creating oscillatory flexural movements of opposite signs for said first and second sinuous conduits; and (e) at least a first means disposed at a section of said second smooth bend adjacent to said first smooth bend, and at least a second means disposed at a section of said third smooth bend adjacent to said fourth smooth bend for measuring difference in said oscillatory flexural movements between the combination of said first and second smooth bends and the combination of said third and fourth smooth bends as a measure of mass flow rate of fluid moving through said first and second sinuous conduits.

2. The combinations as set fourth in claim 1 wherein said means for exerting oscillatory force vibrates said first and second sinuous conduits at resonance frequency thereof.

3. An apparatus for measuring flow rate comprising in combination:

(a) a frame;

(b) a first sinuous conduit disposed on a first plane and secured to said frame at two extremities thereof, said first sinuous conduit including a first generally straight section adjacent to one extremity of said first sinuous conduit; a first smooth bend adjacent to said first generally straight section turning about a first direction; a second smooth bend adjacent to said first smooth bend turning about a second direction opposite to said first direction; and a second generally straight section intermediate said second smooth bend and the other extremity of said first sinuous conduit, wherein the combination of said first generally straight section and said first smooth bend and the combination of said second smooth bend and said second generally straight section are axisymmetric to one another about a first axis perpendicular to said first plane and passing through midsection of said first sinuous conduit;

(c) a second sinuous conduit disposed on a second plane parallel to said first plane and secured to said frame at two extremities thereof, wherein said second sinuous conduit and said first sinuous conduit providing two flow passages connected to a common inlet and outlet are axisymmetric to one another about a second axis located half way between said first and second planes and substantially intersecting said first axis in perpendicular angle;

(d) means for exerting oscillatory force to said first and second sinuous conduits at midsections thereof, wherein means vibrates said first and second sinuous conduits relative to one another in directions transverse to the planes including said first and second sinuous conduits, and thus creating oscillatory flexural movements of opposite signs for said first and second sinuous conduits; and (e) at least a first means disposed at a section of said first smooth bend adjacent to said first generally straight section, and at least a second means disposed at a section of said second smooth bend adjacent to said second generally straight section for measuring difference in said oscillatory flexural movements between the combination of said first generally straight section and said first smooth bend and the combination of said second smooth bend and said second generally straight section as a measure of mass flow rate of fluid moving through said first and second sinuous conduits.

4. The combination as set forth in claim 3 wherein said means for exerting oscillatory force vibrates said first and second sinuous conduits at resonance frequency thereof.

* * * * *